United States Patent [19]

Coffey et al.

[11] Patent Number: 5,389,276
[45] Date of Patent: Feb. 14, 1995

[54] AIRCRAFT DEICING FLUID WITH THERMAL AND PH-STABLE WETTING AGENT

[75] Inventors: David A. Coffey; Edward C. Y. Nieh; Richard A. Armstrong, all of Austin, Tex.

[73] Assignee: Texaco Inc., White Plains, N.Y.

[21] Appl. No.: 151,688

[22] Filed: Nov. 15, 1993

[51] Int. Cl.$^6$ .................................................. C09K 3/18
[52] U.S. Cl. ............................................ 252/70; 252/71; 206/13
[58] Field of Search .......................... 106/13; 252/70, 71

[56] References Cited

U.S. PATENT DOCUMENTS

| | | | |
|---|---|---|---|
| 3,412,050 | 11/1968 | Wahlberg | 252/70 |
| 4,358,389 | 11/1982 | König-Lumer et al. | 106/13 |
| 4,585,571 | 4/1986 | Bloom | 106/13 |
| 4,698,172 | 10/1987 | Tye et al. | 106/13 |
| 4,744,913 | 5/1988 | Salvadore et al. | 106/13 |
| 4,954,279 | 9/1990 | Ma et al. | 252/70 |
| 5,064,552 | 11/1991 | Oppenlaender et al. | 252/71 |
| 5,118,434 | 6/1992 | Meyer et al. | 252/70 |
| 5,118,435 | 6/1992 | Nieh | 252/70 |
| 5,273,673 | 12/1993 | Ashrawi et al. | 106/13 |

FOREIGN PATENT DOCUMENTS

| | | | |
|---|---|---|---|
| 487190 | 5/1992 | European Pat. Off. | 252/70 |

*Primary Examiner*—Anthony Green
*Attorney, Agent, or Firm*—James L. Bailey; Kenneth R. Priem; Cynthia L. Hunter

[57] ABSTRACT

Disclosed is an ethylene glycol based deicing/anti-icing composition which contains a thickener comprising a polyacrylic acid having a molecular weight of from about 90,000 to 100,000 and a wetting agent from the group consisting of nonylphenol ethoxylates, alkarylsulfonates, polyoxyethylene phosphates and tetrafunctional block copolymers of EO/PO on an ethylene diamine backbone and demonstrates improvement in anti-icing ability as measured by holdover time while not adversely effecting aerodynamic performance or Newtonian rheology of the deicer measured by passing the minimum requirements of the AMS test for Type I fluids.

13 Claims, No Drawings

AIRCRAFT DEICING FLUID WITH THERMAL AND PH-STABLE WETTING AGENT

FIELD OF THE INVENTION

This invention relates to water/glycol compositions which have both deicing and anti-icing properties when applied to surfaces. More particularly this invention relates to an ethylene glycol based aircraft deicing composition containing 90,000–100,000 m.w. polyacrylic acid as a thickener which unlike most deicing fluids in its class also exhibits extended anti-icing ability measured by holdover time.

The subject composition also exhibits improvements in hard water compatibility, thermal stability and corrosion protection in the liquid and vapor space of the storage tank.

BACKGROUND OF THE INVENTION

Liquid substances applied to the airfoil surfaces of aircraft to prevent their freezing and being covered with ice in inclement weather are well-known and are important to ensure safe and proper takeoff of aircraft in winter. Deicing solutions based upon ethylene glycol and water have been used for many years to remove ice, frost and snow from aircraft surfaces, however, since they have low viscosities, they readily flow off the aircraft surfaces and thus provide limited protection from formation of additional frost. Anti-icing fluids are those that will prevent formation of frost and ice on surfaces over extended periods such as overnight and in the case of delays between departure from the gate and takeoff.

The fluids may be diluted somewhat through intentional dilution with water, such as during particularly cold conditions below the expected operating temperatures of the fluids to enable their application, or incidentally as through freezing rain conditions. In addition to these demands, the deicing materials must also exhibit Newtonian rheology, that is, a viscosity that is shear-independent and time-independent. They simply flow off the wing surfaces after deicing. Such compositions are also useful in the deicing of other surfaces besides air foils, for example, runway and vehicle roadway surfaces.

It is also well-known that aircraft departures are often delayed under inclement weather conditions and the anti-icing formulations must often be reapplied if the plane must wait an extended period. These liquids must be stable not only through temperature extremes, but also during the taxiing phases of the takeoff procedure and thus must adhere to the wing surfaces during travel and ground winds.

Deicing/anti-icing can be performed in one or two steps. One-step deicing/anti-icing is carried out with an anti-icing fluid. The fluid is used to deice the aircraft and remains on aircraft surfaces to provide limited anti-ice capability. Two-step deicing/anti-icing consists of two distinct steps. The first step (deicing) is followed by the second step (anti-icing) as a separate fluid application. Anti-icing fluid is applied to protect the relevant surfaces thus providing maximum possible anti-ice capability. However, usually two different trucks and attendant systems are used to apply the deicing fluid and then the anti-icing fluid. It takes a few minutes to move the first deicing truck away and the second, anti-icing truck, into position. Holdover times are thus important for deicing fluids because the deicing fluid should remain on the wing to protect it until the anti-icing fluid is applied. If the deicing fluid does not stay on the surface during this period, under some weather conditions clear ice can form in the interim which is quite undesirable. For more information, see SAE Aerospace Recommended Practice: Issued Proposed Draft (SAE ARP4737) (SAE-i.e. Society of Automotive Engineers, Inc.).

Two main categories of deicing/anti-icing fluids have developed, Type I and Type II. It is important to keep in mind the difference between aircraft deicing, which is the procedure by which frost, ice or snow is removed from the aircraft in order to provide clean surfaces, and aircraft anti-icing, which is the procedure which provides protection against the formation of frost or ice and accumulation of snow or slush on clean surfaces of the aircraft for a limited period of time. While there are similarities between deicing compositions and anti-icing compositions, there are some important differences, too. As mentioned, deicing compositions have Newtonian rheology. The shear rate of a Newtonian fluid is directly proportional to the shear stress. The fluid will begin to move immediately upon application of a stress; it has no yield stress which must be accomplished before flow begins. One publication describing the important differences between deicing compositions and anti-icing compositions (including those mentioned above) is M. S. Jarrell, "SAE Type I Aircraft Deicing/Anti-icing Fluids," FAA *International Conference on Airplane Ground Deicing*, May 28–29, 1992, Reston, Va.

Type I is also described in "Deicing/Anti-Icing Fluid, Aircraft, Newtonian-SAE Type I"; Aerospace Material Specification, AMS 1424, Jan. 1, 1993. (Available from SAE International, 400 Commonwealth Drive, Warrendale, Pa. 15096-0001). This publication sets forth technical requirements, quality assurance provisions, etc. and is submitted for recognition as an American National Standard.

Type I is characterized as unthickened, is at least 80% glycol, the viscosity depends on the temperature and it demonstrates limited anti-icing capability relative to holdover time. Hill, E. G., et al., "Effects of Deicing Fluids", AIRLINER, October–December 1989.

Another publication addresses non-Newtonian, pseudo plastic fluids, designated SAE Type II. "Fluid, Aircraft Deicing/Anti-Icing, Non-Newtonian, Pseudo-Plastic, SAE Type II", Aerospace Material Specification, AMS 1428, Jan. 1, 1993.

Type II is characterized as thickened, is at least 50% glycol, the viscosity depends on temperature and shear rate acting on the fluid and it demonstrates good anti-icing capability, Hill, supra, p. 2.

Various deicing and anti-icing compositions are known. For example, U.S. Pat. No. 4,358,389, to König-Lumer et al. (1982) discloses a liquid agent for deicing which is essentially composed of (a) glycols, primarily propylene glycol, (b) water, (c) thickeners, (d) substances insoluble in water, (e) surface-active agents, (f) corrosion inhibitors and alkaline compounds, having a pH value of 7.5 to 10. The object of this invention was to find an agent which fulfilled important demands such as stability against shear, viscosity, rheological behavior and holdover time. This research resulted in a thickener comprising cross-linked polyacrylates having specific physical parameters.

U.S. Pat. No. 4,954,279, to Ma et al. (1990), discloses another approach to anti-icing, deicing compositions comprising the use of a continuous phase and a discontinuous phase, wherein the continuous phase contains the glycol (primarily ethylene glycol) and water and a discontinuous phase contains a water-insoluble oil and the oil comprises at least one substantially water-insoluble partially polar compound, such as, for example, carboxylic, sulfonic and phosphonic acids, salts or polar esters having hydrocarbyl substituents of at least about 6 carbon atoms per group.

U.S. Pat. No. 4,744,913, to Salvador et al. (1988) discloses a deicing and anti-icing agent based on glycols and water (primarily diethylene glycol and propylene glycol) and containing cross-linked acrylic polymers as the thickener. The composition also contains customary corrosion inhibitors, surfactants belonging to the group of alkali metal alkylarylsulfonates and a neutralizing agent to adjust the pH to a basic value. The thickener comprises two cross-linked acrylic polymers in a specific ratio by weight to one another, namely a selected cross-linked acrylic acid or alkali metal acrylate homopolymer and a selected cross-linked acrylic acid/acrylamide or alkali metal acrylate/acrylamide copolymer in a ratio by weight of 2:1 to 10:1.

U.S. Pat. No. 4,698,172, to Tye et al. (1987) discloses the use of carrageenan, a sulfated polysaccharide gum derived from marine algae, in a glycol-based anti-icing fluid (preferably ethylene glycol) in an amount sufficient to thicken the fluid to promote its adherence to aircraft surfaces (less than 5 wt %, preferably 0.05 to 3 wt % and more preferably 0.1 to 1 wt %). It is stated the fluid thickened by this substance does not adversely affect airfoil lift characteristics during take-off because the fluid exhibits shear thinning.

U.S. Pat. No. 4,585,571, to Bloom (1986) discloses a deicing fluid which is claimed to effectively remove existing ice and prevent its reformation for at least eight hours without adversely affecting the compatibility properties of the fluid. The deicing fluid contains, in addition to an alkylene polyol, an anionic surfactant capable of forming a hydrophobic monolayer on the metal surfaces of the aircraft, a hydrophilic wetting agent which is capable of associating with the hydrophobic monolayer, and a coupling agent which facilitates the association between the wetting agent and monolayer.

Chemical Abstract 108:223486p (1988) of Romanian patent document RO 92,551 briefly sets out sprayable deicing compositions that form films with high shear resistance on aircraft which contain 250–500 parts propylene glycol, 5–15 parts polyacrylamide, 0.5–1 part $Na_2HPO_4$ or borax, 0.5–1 part ethoxylated nonylphenol or oleyl alcohol with a degree of ethoxylation of 17, and 250–500 parts of water.

British Patent Specification 1,272,464 discusses a deicing fluid having an aqueous solution of an alcohol component which comprises one or more of ethylene glycol, propylene glycol and glycerol; a polyethylene glycol ether of a diisoalkylphenol; and a thickening agent which is a copolymer of acrylic acid or methacrylic acid.

An antifreeze mixture for internal combustion engines based on ethylene glycol and/or propylene glycol which is free of nitrates and phosphates is disclosed in U.S. Pat. No. 5,064,552, to Oppenlaender et al. (1991).

U.S. Pat. No. 5,118,434, to Meyer et al. (1992) addresses the problem of precipitation of salts from glycol-based fluids and discloses a method for adding copolymers or terpolymers of acrylic acid or the alkali metal salt thereof and one or more monomers selected from the group consisting of 2-acrylamido-2-methylpropyl sulfonic acid or metal salt thereof, a lower alkyl hydroxy acrylate, and mixtures thereof in order to prevent the precipitation. The glycol-based fluids are mentioned as deicing fluids.

It is noted that most of the deicing/anti-icing fluids discussed in the art which contain high molecular weight acrylic acid thickeners produce non-Newtonian or Type II rheology.

It is also noted that in the past, when those in the art attempted new formulations, whether Type I or Type II, they typically encountered additional problems with hard water compatibility, thermal stability and corrosion protection properties.

Further, it does not appear the criticality of wetting agents has been addressed in the art. The identification of wetting agents which maintain stability at higher temperatures and pH appears to be a critical step in formulating a composition with the improved properties claimed herein.

Generally deicing fluids known in the art have not exhibited long lasting protection against ice reformation without compromising the compatibility properties of the deicing fluid. There would be a great commercial potential in the art for a deicing fluid which exhibits extended anti-icing holdover time, but which, unlike prior art high molecular weight acrylic acid thickened fluids which produce non-Newtonian rheology, would still have Type I, Newtonian rheology and could pass the requirements for a Type I, Newtonian type fluid.

It would also be valuable if a formula were available which possessed both deicing and anti-icing properties and also provided improvements in hard water compatibility, thermal stability and corrosion protection.

SUMMARY OF THE INVENTION

Accordingly, it is an object of the present invention to provide a thickened deicing/anti-icing composition which exhibits extended anti-icing activity, but which also exhibits Type I Newtonian rheology.

It is another object to provide a deicing composition which provides improvements in hard water compatibility, thermal stability and corrosion protection.

In carrying out these and other objects of the invention, there is provided an anti-icing composition having an alkylene glycol component; a thickener comprising a polyacrylic acid having a molecular weight of about 70,000 to 120,000, benzo- or tolyltriazole, phosphoric acid, a wetting agent, and an agent to neutralize the acid components.

It is also an object of this invention to provide a stable wetting agent component in the fluid which will not decompose during storage or at operating temperatures in the range 60°–82° C. and at a pH in the range 8–9. When these changes occur the fluid properties change, i.e., surface tension rises, wetting ability decreases, and a loss of holdover time results.

DETAILED DESCRIPTION OF THE INVENTION

The novel deicing/anti-icing composition of the instant invention can be described as follows:

1) About 85%–98% by weight alkylene glycol component;
2) About 0.2%–1.0% by weight of a polyacrylic acid having a molecular weight of about 70,000 to 120,000;

3) About 0.3% to 0.6% tolyltriazole or benzotriazole;
4) About 200 to 600 ppm phosphoric acid or borate;
5) About 0.2% to 1.0% surfactant/wetting agent;
6) A neutralizing agent in a quantity sufficient to neutralize the acid components and bring the pH to 8-10; and
7) Water balance to 100%.

It has been discovered that the addition of a polyacrylic acid of about 70,000 to 120,000 and, more preferably, 90,000 to 100,000 molecular weight to the ethylene glycol based deicing composition of the instant invention gave improved viscosity properties in applications where high or consistent viscosity and/or pseudoplastic rheology is desired, such as in anti-icing compositions for aircraft where adherence to the airfoil surfaces, sometimes for long periods, is important.

Generally, a fluid which provides these anti-icing advantages cannot pass the requirements for a Type I, Newtonian deicer. However, the composition for the instant invention has improved anti-icing capabilities, as measured by holdover time, but maintains Newtonian rheology. The composition can remove ice from wings of aircraft and also prevent ice from forming for longer than 3 minutes in freezing rain and longer than 20 minutes in high humidity as outlined in the AMS requirements for Type I, supra. This requirement was not necessary in earlier documents on the same type of fluid (AMS 1425 ad 1427, MIL-A 8243).

In addition to improved anti-icing properties, it will also be demonstrated that the composition of the instant invention exhibits improved hard water stability, improved thermal stability and better corrosion protection in the vapor space and liquid in the storage tanks.

The minimum hard water stability requirement for Type I fluids is that when the fluids are diluted 1:1 by volume with standard hard water, the fluid shall show no evidence of insoluble deposit or increase in turbidity greater than a freshly made sample and the pH shall not vary by more than 0.5 units from a fresh unaged sample.

As demonstrated in Example I, the fluid of this invention showed no separation or precipitation even after being heated to 95° C. and being stored for 30 days.

The instant composition also prevents deposition of buffering agents such as, for example, borates, phosphates, etc., on tank walls at high temperatures (60° C. to 100° C.) in the concentrated and diluted form of the fluid. This is undesirable because of the periodic cleaning of the tanks required and loss of buffering ability of the fluid.

The first component of the composition is an alkylene glycol or a mixture of one or more alkylene glycols. For example, the alkylene glycol may be selected from ethylene glycol, propylene glycol, diethylene glycol, dipropylene glycol and mixtures thereof. Other alkylene glycols not specifically mentioned may be useful. The preferred alkylene glycol for use in the instant invention is ethylene glycol. Most known Type II fluids are based on propylene glycol and, in most cases in the art, it appears it is more common for Type I fluids to contain ethylene glycol. Generally Type I fluids, often containing ethylene glycol, do not contain thickeners and they are usually not capable of extended anti-icing properties.

The alkylene glycol component is at least 50%, but not more than 98% by weight of the total anti-icing composition. The alkylene glycol component is present in an amount between about 80% and 98% by weight of the composition. In a preferred embodiment, the alkylene glycol component ranges from about 85% to 98 wt %, based on the total composition.

The thickener blend is the second important part of the deicing/anti-icing composition and is comprised of polymers of acrylic acid. The thickener should be a homopolymer or copolymer. The thickener can be a polyacrylic acid having a molecular weight of between about 500 and 200,000. The preferred molecular weight is from about 70,000 to greater than 100,000. The examples demonstrate the effectiveness of a 90,000 m.w. polyacrylic acid from Aldrich Chemical and a 100,000 m.w. polyacrylic acid called SOKALAN® PA80S from BASF.

The term polyacrylic acid, as used herein, also encompasses substituted polyacrylic acids, such as, for example, polymethacrylic acid. Also useful are copolymers, specifically maleic/acrylic copolymer.

The thickener component may be present in the composition in an amount from about 0.1% to 2.0% by weight, preferably from about 0.2% to 1.0% by weight. It was found that addition of 0.5 wt % of a 90,000 m.w. polyacrylic acid increased the viscosity of the blend of the instant invention, compared to an unthickened commercial product (WD-30), without giving non-Newtonian rheology. WD-30 is a traditional ethylene glycol-based deicing fluid available from Texaco Chemical Co.

Another component of the deicing/anti-icing composition is a surfactant which functions as a wetting agent of the aircraft surface. The surfactant should not contribute to excessive foaming of the composition. Any wetting agent which lowers surface tension, provides good wetting ability on aircraft surfaces, and is stable to temperature extremes typical in deicer usage can be useful. The surfactant is generally employed in an amount in the range of 0.2% to 1% and preferably 0.3 to 0.7 based on the total composition.

Anionic surfactant wetting agents which have been employed in the art include, for example, sodium dioctylsulfosuccinate, petroleum sulfonates, and any other compound which provides wetting ability to metal surfaces.

It has now become apparent that stability to temperature extremes and pH is critical for the wetting agent in order for the fluid to exhibit both Newtonian properties as well as extended anti-icing properties. Preferred wetting agents include, but are not limited to, nonylphenol ethoxylates, alkaryl sulfonates (7-20 carbon alkyl groups), polyoxyethylene phosphates and low-foam tetrafunctional block copolymers of ethylene oxide/propylene oxide (EO/PO) on an ethylene diamine backbone.

Examples of tetrafunctional block copolymers of EO/PO on an ethylene diamine backbone include commercially available products such as Pluronic 25-R-2 and Pluronic 31-R-1 from BASF.

Alkylaryl sulfonates having 7 to 20 carbon alkyl groups can also be employed as wetting agents. Examples include Polystep® C-OP-3S ($C_8H_{17}Ar(EO)_3Na^+$-$SO_3^-$) from Stepan Company and Calsoft F-90 (dodecyl aryl sulfonate) from Pilot Chemical.

Also useful are polyoxyethylene phosphates. Examples include Chemfac PB-106 (Polyoxyethylene (6) Decyl Ether Phosphate) from Chemax, Inc.

Good results were observed when SURFONIC® N-85 was employed as the wetting agent, as demonstrated by Example 2.

It is preferred that a neutralizing agent also be used in conjunction with the polyacrylic acid homo- and copolymer to at least partially neutralize them. The neutralizing agent may be selected from the group of alkaline metal hydroxides, organic amine bases and mixtures thereof. A corrosion inhibitor, discussed below, may also be useful as a neutralizing agent. The quantity of neutralizing agents required is determined by molecular weight of the agent and the quantity of polyacrylic acid employed in the specific formula and the amount of free acid groups possessed by the polymers. In general, the base neutralizing agent is needed to neutralize from about 20% to 90% of the carboxylic acid groups in the thickener. Preferably, sufficient base is present to neutralize 30% to 80% of the carboxylic groups.

A corrosion inhibitor is also preferred as part of the deicing/anti-icing composition. The corrosion inhibitor may be any of those conventionally used in the art of aircraft anti-icing compositions. A type of compound which works quite effectively in this capacity is an alkaline metal salt of tolyl triazole or benzotriazole. The corrosion inhibitor also helps prevent the glycols from possible combustion under the influence of an open electrical charge. The corrosion inhibitor is present in an amount of about 0.1% to 1.0% by weight of composition. A preferred amount is from about 0.3% to 0.6%. In some cases, the corrosion inhibitor may also serve to neutralize the polyacrylic acids of the thickener blends as well.

An antifoamant may be necessary to reduce or control the amount of foam. Any commercially available antifoamer can be used. The amount is preferably in the range of from 0.05% to 0.5% by weight based on total weight of the composition. One example is Patcote ® 492 produced by Patco Specialty Chemicals Division of American Ingredients Company.

A buffering agent is desirable in an amount sufficient to protect carbon steel storage tanks. The amount of protection is measured by the reserve alkalinity of the fluid. Examples of suitable buffering agents include, but are not limited to phosphates and borates.

As is conventional, water provides the balance of the deicing/anti-icing composition. Water may also be used to dilute the composition, if necessary for deicing purposes.

The following examples are intended only for the purpose of illustration and are not intended to limit the scope of the invention in any way.

EXAMPLE 1 (6979-83-1)

First Reduction to Practice

The following components were mixed together for 45 minutes to give 500 g of a homogeneous orange-red mixture:

| Component | Amount, g |
| --- | --- |
| Ethylene Glycol | 463.6 |
| Na Dioctylsulfosuccinate, 70% | 1.5 |
| 90,000 mw Polyacrylic acid, 25% | 10.0 |
| Sodium Tetraborate Pentahydrate | 5.0 |
| Potassium Hydroxide, 45.7% | 4.0 |
| Sodium Tolyltriazole, 50% | 5.8 |
| Deionized Water | 10.06 |
| Eocine Orange Die | 0.01 |

The 90,000 mw polyacrylic acid was obtained from Aldrich Chemical.

A solution diluted 1:1 by volume of standard hard water (AMS 1424) remained clear even after heating the solution at 95° C. for 30 days. The undiluted solution was heated to 95° C. and showed no separation or precipitation after 30 days. A 1:1 dilution with deionized water was prepared and tested for water spray endurance holdover time as in AMS 1424. The fluid passed the requirement with an average holdover time of 6.25 minutes. The pH of the fluid, diluted 1:1 with deionized water was 8.0, and the reserve alkalinity (amount of acid to titrate the solution to pH=5.5) was found to be 16.44 mL. To show that the fluid has Newtonian rheology, the fluid was tested for viscosity with a Brookfield viscometer model DV-II. The viscosity, using spindle SC4-31/13R at three different spindle speeds, was 7.5 cP at 12 rpm, 11.0 cP at 30 rpm, and 12 cP at 60 rpm. Within the error associated with the spindle the viscosity is Newtonian.

EXAMPLE 2 (7143-15-4)

Nonionic surfactants such as SURFONIC ® N-85 are known to be stable at temperature extremes. SURFONIC ® N-85 surface active agent is a nonionic reaction product of ethylene oxide with nonylphenol, produced by Texaco Chemical Company. The number following the letter "N", for example "-85", is a tenfold multiple of the molar ratio of ethylene oxide in the adduct.

A formulation was prepared as below and tested to see if surface tension was lowered acceptably and wetting ability was adequate.

| Stock Solution: | |
| --- | --- |
| Component | 7143-15, g |
| Ethylene Glycol | 3275.2 |
| 100,000 mw P.A.A., 35% | 50.0 |
| Na Tetraborate*5H$_2$O | 23.4 |
| KOH, 45.9% | 35.0 |
| Tolyltriazole, 50% | 40.6 |
| Water | 35.8 |
| Eocine Orange | 0.07 |

The 100,000 mw polyacrylic acid goes by the name SOKALAN ® PA 80S and was obtained from BASF.

From the stock solution, the following deicer was prepared: Stock solution, 494.3 g; water, 5.2 g, SURFONIC ® N-85, 0.5 g. The undiluted and diluted (1:1 with water) fluid was tested for surface tension, using a du Nuoy surface tensiometer with a ring attachment as in ASTM standard test method D1331. The undiluted fluid had a surface tension of 43.25 dynes/cm. The diluted fluid had a surface tension of 30.92 dynes/cm. Spatula Test: A test to predict the wetting ability of the fluid at 0° C. was devised: A dry, clean stainless steel spatula was dipped into 20 mL of the diluted fluid which had been previously chilled to 0° C., removed, and observed to see how completely the fluid coats the spatula. This test could be used as a prediction of whether the fluid would coat adequately to pass the freezing rain endurance test (give adequate holdover time protection) according to AMS 1424. The diluted fluid showed excellent coating, even after the fluid had been heated at 95° C. for 3 days. The pH of the fluid was not determined but is believed to be between 8 and 9.

The fluid produces a stable foam when agitated. This is undesirable, and a suitable anti-foamant such as Patcote ® 492 produced by Patco Specialty Chemicals Division of American Ingredients Company could be used which would prevent foam buildup when the fluid is being pumped, mixed and sprayed.

EXAMPLE 3 (7143-3-1)

This example shows that a maleic acid/acrylic acid copolymer of 70,000 mw (BASF SOKALAN® CP5) gives a product with adequate holdover time in the freezing rain endurance test.

The following components were mixed in the manner of the previous examples.

| Component | Amount, g |
|---|---|
| Ethylene Glycol | 472.8 |
| Na Sulfosuccinate, 70% | 0.7 |
| SOKALAN CP5 | 6.2 |
| Na Tetraborate*5H$_2$O | 3.4 |
| KOH, 45.9% | 1.0 |
| Na Tolyltriazole, 50% | 5.8 |
| Water | 10.1 |
| Eocine Orange | 0.01 |

The fluid was diluted 1:1 with deionized water and was found to have a holdover time of 8.25 minutes in freezing rain conditions. The viscosity at 0° C. for this fluid was found to be 7.5 cP at 12 rpm, 7 cP at 30 rpm, and 8 cP at 60 rpm.

EXAMPLE 4 (7143-3-2)

The same composition as in the last example was prepared except that SOKALAN CP7 (50,000 mw maleic/acrylic copolymer) was used instead of SOKALAN CP5. The composition attained a holdover time of 6.83 minutes in freezing rain conditions. The viscosity at 0° C. was found to be 7.5 cP at 12 rpm, and 8 cP at 60 rpm.

EXAMPLES 5 AND 6 (6979-99-1 and 6979-99-2)

The next two samples show that by reducing the wetting agent (sodium dioctylsulfosuccinate) by one-half, no sacrifice in performance is noticed.

The following components were mixed together for 45 minutes until 1000 g of a homogeneous, orange-red mixture was derived:

| Component | 99-1, g | 99-2, g |
|---|---|---|
| Ethylene Glycol | 934.2 | 935.8 |
| Na Sulfosuccinate, 70% | 3.0 | 1.4 |
| 100,000 mw P.A.A., 35% | 4.3 | 14.3 |
| Na Tetraborate*5H$_2$O | 6.7 | 6.7 |
| KOH, 45.9% | 10.0 | 10.0 |
| Tolyltriazole, 50% | 11.6 | 11.6 |
| Water | 20.2 | 20.2 |
| Eocine Orange | 0.02 | 0.02 |

Both fluids were diluted 1:1 with deionized water and tested for holdover time in freezing rain and high humidity. 6979-99-1 gave holdover times of 5.83 minutes in freezing rain and 24.5 minutes in high humidity. 6979-99-2 gave holdover times of 6.25 minutes in freezing rain and 40 minutes in high humidity. The viscosity at 0° C. of the two fluids was identical to the last example.

The second fluid (6979-99-2) was tested for viscosity at different temperatures with spindle SC4-18/13R. The fluid's viscosity is Newtonian, i.e., no change in viscosity with shear rate. The results are tabulated below:

| Temp., °C. | ←RPM*→ | | | | | | | |
|---|---|---|---|---|---|---|---|---|
| | 0.3 | 0.6 | 1.5 | 3.0 | 6.0 | 12.0 | 30.0 | 60.0 |
| +20 | — | — | — | 6 | 8 | 7.8 | 6.7 | 5.8 |
| 0 | — | — | 18 | 18 | 16 | 14 | 12 | 11 |
| −10 | — | 15 | 22 | 19 | 18 | 17 | 15 | 14 |
| −20 | — | 25 | 20 | 24 | 26 | 24 | 22 | 21 |

— = Too Low, no reading available
*RPM using SC4-18/13R

Values in cP.

EXAMPLES 7 AND 8

(Comparative Examples 7143-17 and 7143-4-1)

The following examples show that when heating a formulation with a thermally and pH-unstable wetting agent (Na sulfosuccinate), loss of surface tension and wetting ability occurs, leading to a fluid with less holdover time.

Both of the examples listed above were prepared with the composition listed below. The following components were mixed together for 45 minutes until a homogeneous, orange-red mixture was derived:

| Component | Amount, g |
|---|---|
| Ethylene Glycol | 93.576 |
| Na Sulfosuccinate, 70% | 0.14 |
| 100,000 mw P.A.A., 35% | 1.43 |
| Na Tetraborate*5H$_2$O | 0.67 |
| KOH, 45.9% | 1.0 |
| Tolyltriazole, 50% | 1.16 |
| Water | 2.022 |
| Eocine Orange | 2.022 |

7143-17 was tested diluted 1:1 with water to determine the amount of active Na sulfosuccinate in the fluid before heating. The amount of Na sulfosuccinate was found to be 0.00115 meq/g. The surface tension of the diluted fluid was 31.61 dynes/cm. After heating the fluid for 48 hours at 82° C., the amount of active Na sulfosuccinate had dropped to 0.0002 meq/g and the surface tension had risen to 38.86 dynes/cm. The spatula test was tried on the starting fluid and wetting was excellent. When the spatula test was performed on the fluid which had been heated, the test showed very poor wetting, confirming that the wetting agent had decomposed. The pH of the fluid before thermal testing was 8.5.

7143-4-1, which, undiluted, was confirmed to have a low concentration of active Na sulfosuccinate (0.0002 meq/g) and high surface tension (48.22 dynes/cm) was tested (diluted 1:1 with water) for holdover time in freezing rain conditions. The holdover time was found to be only 1.22 minutes, which is not acceptable under AMS 1424. This shows that the wetting agent is necessary to achieve the holdover time requirement.

EXAMPLE 9 (Comparative Example 7143-14)

A fluid was prepared as in Examples 3 and 4 above, except that no wetting agent was included in the formulation (the sulfosuccinate was replaced by ethylene glycol). The surface tension of the undiluted blend was found to be 48.78 dynes/cm.

COMPARATIVE EXAMPLE 10 (Comparative Example, WD-30)

A commercial, ethylene glycol based deicer (Texaco WD-30) was diluted 1:1 with deionized water and tested in the freezing rain endurance and high humidity endurance tests in the same way as the previous examples. The fluid had an average holdover time of only 2.5 minutes in the freezing rain test and 14.67 minutes in the high humidity test. Further, the fluid was diluted with hard water as in the above examples and a phosphate precipitate occurred. Also, samples stored on a shelf show precipitation of the phosphate over a period of several weeks. These results are unacceptable based on the new standards in AMS 1424. The viscosity at 0° C. was found to be 10 cP at 12 rpm, 8 cP at 30 rpm, and 9 cP at 60 rpm.

EXAMPLE 11 (6979-95)

The next example shows that by reducing the level of Na tetraborate from 1.0 to 0.67 wt %, the reserve alkalinity is not lowered to unacceptably low levels.

The following components were mixed together for 45 minutes to produce an orange-red solution:

| Component | Amount, g |
|---|---|
| Ethylene Glycol | 467.3 |
| Na Sulfosuccinate, 70% | 1.5 |
| 100,000 mw P.A.A., 35% | 7.2 |
| Na Tetraborate*5H$_2$O | 3.4 |
| KOH, 45.9% | 4.0 |
| Tolyltriazole, 50% | 5.8 |
| Water | 10.9 |
| Eocine Orange | 0.01 |

The 100,000 mw polyacrylic acid goes by the name SOKALAN® PA 80S and was obtained from BASF.

The fluid maintained a pH of 8.67 and a reserve alkalinity of 7.69 mL which is an acceptable level for corrosion protection. The viscosity at different spindle speeds was found to be 7.5 cP at 12 rpm. 8 cP at 30 rpm, and 8.5 cP at 60 rpm.

EXAMPLE 12 - Comparative Example, 6856-42

In comparison to Example 6, example shows the difference in terms of rheology between a Newtonian and non-Newtonian fluid. The example here is a non-Newtonian fluid, i.e., the fluid does not have a constant viscosity with shear rate.

A composition consisting of a 3% aqueous solution of CARBOPOL® 672 to 1621 in a 95:5 ratio (64.2 g), COBRATEC® TT-50S (3.0 g), propylene glycol (310.9 g), (2% sodium xylene sulfonate) (3.5 g), 2% NaOH (23.0 g), and deionized water (195.4 g) was prepared. The blend had a viscosity of 10,400 cP at 0° C. A second blend was prepared with the same components except that 0.6 g of 2% NaXS and 4.0 g of 2% NaOH were substituted for some of the deionized water. This blend had a viscosity of 1200 cP at 0° C. The two blends were combined until a 6000 cP blend was derived. The rheology as a function of temperature is tabulated below:

| Temp., °C. | ←RPM*→ | | | | | | |
|---|---|---|---|---|---|---|---|
| | 0.3 | 0.6 | 1.5 | 3.0 | 6.0 | 12.0 | 30.0 |
| +20 | 5900 | 4000 | 2360 | 1670 | 1190 | 872 | 587 |
| 0 | 6000 | 4200 | 2800 | 2060 | 1550 | 1180 | 831 |
| −10 | 4200 | 3400 | 2480 | 1910 | 1540 | 1230 | 918 |
| −20 | 1900 | 1600 | 1300 | 1150 | 1010 | 874 | 728 |

*Using Spindle SC4-31/13R

What is claimed is:

1. A deicing/anti-icing composition comprising:
   an alkylene glycol component present in an amount between about 80% and 98% by weight of the composition;
   a thickener comprising a polyacrylic acid homopolymer or copolymer having a molecular weight between about 600 and 200,000;
   a corrosion inhibitor selected from the group consisting of an alkaline metal salt of tolytriazole or benzotriazole;
   a buffer selected from the group consisting of phosphates and borates;
   a neutralizer selected from the group consisting of alkali metal hydroxides, organic amines bases and mixtures thereof present in an amount sufficient to neutralize between about 20 wt % to 90 wt % of the carboxylic acid groups present in the thickener; and
   a surfactant/wetting agent selected from the group consisting of nonylphenol ethoxylates, alkylaryl sulfonates having 7–20 carbon alkyl groups, polyoxyethylene phosphates and tetrafunctional block copolymers of ethylene oxide/propylene oxide (EO/PO) on an ethylene diamine backbone.

2. The deicing/anti-icing composition of claim 1 where the alkylene glycol component is selected from ethylene glycol, propylene glycol, diethylene glycol, dipropylene glycol and mixtures thereof.

3. The deicing/anti-icing composition of claim 2 wherein the alkylene glycol component is ethylene glycol.

4. The composition of claim 1 wherein the polyacrylic acid is a homopolymer selected from acrylic or methacrylic.

5. The composition of claim 4 wherein the homopolymer is acrylic.

6. The composition of claim 1 wherein the polyacrylic acid is a copolymer consisting essentially of maleic/acrylic.

7. The composition of claim 1 wherein the polyacrylic acid has a molecular weight between 70,000 and 120,000.

8. The composition of claim 1 wherein the polyacrylic acid homopolymer has a molecular weight of from less than 90,000 to greater than 100,000.

9. The composition of claim 1 where the thickener is present in an amount between about 0.2% and about 0.8% by weight of the anti-icing composition.

10. The composition of claim 1 wherein the surfactant/wetting agent is a tetrafunctional block copolymer of ethylene oxide/propylene oxide (EO/PO) on an ethylene diamine backbone.

11. The composition of claim 1 wherein the surfactant/wetting agent is an alkylaryl sulfonate having 7 to 20 carbon alkyl groups.

12. The composition of claim 1 wherein the surfactant/wetting agent is a polyoxyethylene phosphate.

13. The composition of claim 1 wherein the polyacrylic acid copolymer has a molecular weight of from less than 90,000 to greater than 100,000.

* * * * *